United States Patent [19]

McColgin et al.

[11] 3,879,678

[45] Apr. 22, 1975

[54] OXONOL DYE LASERS

[75] Inventors: William C. McColgin; Frank G. Webster, both of Rochester, N.Y.

[73] Assignee: Eastman Kodak Company, Rochester, N.Y.

[22] Filed: Feb. 14, 1972

[21] Appl. No.: 226,228

[52] U.S. Cl. ... 331/94.5 L; 252/301.2 R; 260/240.2
[51] Int. Cl. .............................................. H01s 3/00
[58] Field of Search ......... 252/301.2 R; 331/94.5 L; 260/240.2

[56] References Cited
UNITED STATES PATENTS
3,753,146  8/1973  Reynolds .................. 331/94.52
3,798,566  3/1974  McColgin et al. .......... 331/94.5 L FOREIGN PATENTS OR APPLICATIONS
848,006  7/1970  Canada

*Primary Examiner*—Arthur P. Demers
*Attorney, Agent, or Firm*—D. M. De Leo

[57] ABSTRACT

Oxonol dyes are useful as laser dyes. These dyes are used in solution with a non-interfering solvent to form lasing media useful in dye lasers. Such lasers generally include a reservoir for containing the laser dye solution and a pumping energy source operably associated therewith for producing stimulated emission of the laser dye solution.

8 Claims, No Drawings

OXONOL DYE LASERS

BACKGROUND OF THE INVENTION

1. Field of Invention

This invention relates to lasers and more particularly to the use of a certain class of dyes as lasing media for organic dye lasers.

2. Description of the Prior Art

Many of the materials discovered thus far which are capable of acting as lasing media have been in the solid or gaseous state. Solid lasers typically suffer from such disadvantage as cracking and optical imperfections. It is also known that certain organic dyes in solution can operate as "liquid" or "organic dye" lasers. Of the range of materials useful as lasing media, organic lasing dyes provide certain advantages. A wide range of organic dye lasers is available to provide stimulated emission (lasing) over a broad range of the spectrum. Secondly, organic dye lasers are generally capable of being tuned to emit over a range of wavelengths, this being in contradistinction to the essentially single wavelength capability of lasing emission characterizing gas and solid lasers. Thirdly, organic dye lasers provide an economical lasing medium when compared to gas and solid lasers, and they do not suffer from disadvantages such as cracking and optical imperfections that are particularly associated with solid lasers.

The ability to selectively tune organic dye lasers derives from the broad band fluorescence characteristic of the component dye. Such lasers can be "tuned" to emit at wavelengths along substantially the entire fluorescence band of the dye by interposing a dispersive element such as a diffraction grating or a prism.

The operation of a laser is achieved as a result of the phenomenon that excited atoms or molecules can emit a photon or quantum of light, which photon or quantum can itself trigger another excited atom or molecule to emit its photon prematurely. This process is designated stimulated emission.

The excitation of organic lasing dyes can be achieved by subjecting the dye, under controlled conditions such as will be described herein, to a suitable source of energy such as bombarding it with electrons or illuminating it with a high energy source. Conventionally, illumination is utilized for liquid laser materials. Excitation of a liquid laser medium by illumination is generally termed "optical pumping" or merely "pumping". Pumping sources include, for example, sources such as giant pulse lasers, xenon and argon arc flash tubes as well as arc discharge tubes containing only air or other gaseous mixtures.

Various arrangements of laser apparatus can be used. A laser structure particularly adapted for organic dye liquid laser media is described by Sorokin et al, IBM Journal, V. 11, p. 148 (1967). Advantageous laser apparatus structures usually include an optically resonant cavity containing a reservoir of a liquid laser medium or a liquid laser body disposed within a thin-walled quartz cylinder. Typically, the reservoir is part of a closed system through which the dye solution is circulated during lasing operation. Thus, located heating which can cause refractive discontinuities and potential breakdown of the dye is effectively prevented. To provide an energy source for exciting the atoms of the laser material, the laser body can be surrounded concentrically by a lamp, such as one containing an annular region within an outer thick-walled quartz cylinder. The annular region can contain an air-argon mixture and have electrodes which are operably connected to a low inductance capacitor charged by a standard high voltage supply. Desirably, coaxially disposed at either end of the optically resonant cavity are opposed internally reflective cavity ends such as mirrors.

When optical pumping is used, the light source emits light having wavelengths within at least one absorption band of the lasing medium. The absorbed light causes molecular electrons in the medium to shift in energy level. Molecular electrons exist either in a singlet state (two electrons spinning in opposite directions) or a triplet state (two electrons spinning in the same direction). The ground state is the unexcited state for molecular electrons and has the lowest energy. Typically, the ground state in almost all molecules is a singlet designated $S^o$), one of many possible energy levels in the singlet state. When the pumping source is activated, the resultant light pulse enters the laser body and photons of energy of appropriate absorptive wavelength are absorbed by active molecules in the body and cause the electrons of such molecules to shift from an initial low energy level ($S^o$) to a high energy level from which emissive transition occurs.

In operation, the molecular electrons of the laser medium are desirably "pumped" to higher excited states of the singlet system by intense energy inputs. It is thought that they then first undergo transitions from such excited states to the lowest excited state (designated $S^1$). After diminishing in energy level to the lowest excited singlet, the molecule can relinquish its remaining excess energy radiatively or non-radiatively from $S^1$ to $S^o$, non-radiatively from $S^1$ to a triplet state and then radiatively or non-radiatively from the lowest excited triplet state to $S^o$. Generally, laser emission consists of optical emission resulting from transitions from $S^1$ to various vibrational modes of $S^o$. Susceptibility to triplet formation upon pumping is deleterious due to typical non-radiative energy losses resulting from triplet to $S^o$ transitions. Also, if there is significant overlap between the triplet absorption and either the pump bands or lasing emission bands, laser action generally will be impeded or will fail entirely. Additionally, advantageous laser emission can occur only when the population of molecules established at this higher energy level in the laser body by such light pumping exceeds the population of molecules remaining at the initial low energy level, a condition conventionally designated "population inversion" or "inversion of energy states".

Upon reaching an inversion of energy states, individual molecules of the high energy level population undergo emissive transition spontaneously, shifting to a terminal low energy level as described herein with a concomitant emission of light. A portion of the spontaneously emitted light is usually reflected back and forth through a resonant optical cavity structure, such as previously described, between its internally reflective ends. As this light passes through the laser body in multiple bidirectional reflections, it induces other molecules of the enlarged high energy level population to undergo premature light emissive transitions as noted herein. This produces more light, which augments the bidirectionally reflected light in the cavity to induce still further light emissive transitions. A rising pulse of bidirectionally reflected light quickly develops in the cavity, reaching a quantitatively large value as the in- I. 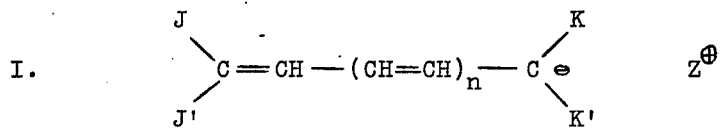

duced emissive transition of molecules from the high energy level population increases. If one of the reflective cavity ends is partially transmissive, as is typically the case, a portion of the intense reflected light pulse passes through the one end and out of the cavity to constitute the laser output light pulse or the laser beam.

As mentioned previously, organic dye lasers have many advantages over solid and gas lasers. However, depending upon the wavelength of lasing desired, one must choose entirely different classes of dyes to obtain the appropriate result. For example, coumarin dyes such as umbelliferone are useful in the short wavelength region, fluorescein is useful in the medium wavelength region and rhodamines such as Rhodamine 6G are useful in the longer wavelength region as are long chain cyanine dyes such as 3,3'-diethylthiatricarbocyanine iodide.

wherein:

$n$ represents a positive integer having a value of 1 to 3;

$Z^+$ represents a hydrogen atom or a cation, e.g., various amine cations such as trialkylamine, etc.

J, J', K and K' each represent a member selected from a cyano radical with the proviso that only one of J and J' and one of K and K' can be a cyano radical, an alkoxycarbonyl radical having from 1 to about 4 carbon atoms in the alkyl moiety, an acyl radical having 1 to about 4 carbon atoms in the alkyl portion and including aracyl radicals (e.g., phenylcarbonyl, etc), a substituted sulfonyl radical having such substituents as alkyl radicals having 1 to 5 carbon atoms, aryl radicals and aryloxy radicals and when J and J' or K and K' are taken together with the carbon atom to which they are attached, represent, respectively, the radicals:

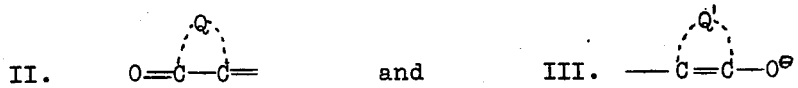

From a synthesis standpoint, it can be readily appreciated that generally, it is less expensive to manufacture various members of a single class of dyes than to manufacture several distinct classes of dyes in order to obtain the desired wavelengths of lasing. Accordingly, there is a need in the art for a class of dyes which by minor alterations thereof can be made to lase across virtually the entire visible spectrum.

SUMMARY OF INVENTION

We have found that a class of oxonol dyes are useful as lasing media in liquid dye lasers. This class of dyes includes various individual dyes which, upon stimulated emission, have differing wavelengths of lasing. Thus, minor modifications of the basic class of dyes allows one to form dye lasers which will emit at any preselected region of the visible spectrum.

In dye laser apparatus, the lasing medium can be changed readily merely by removing the dye solution from the lasing cavity, cleaning the cavity and adding a new dye solution. This ease of interchange of dyes allows for great flexibility in the apparatus in that one can readily select the desired wavelength of lasing.

DESCRIPTION OF PREFERRED EMBODIMENTS

The objects of the present invention are obtained through the use, with dye lasers having a reservoir means containing a laser dye solution and a pumping energy source capable of producing stimulated emission of the solution which comprises a lasing concentration of dye in a non-interfering solvent (i.e., one that does not inhibit stimulated emission), of an oxonol dye.

The dyes useful in this invention are oxonol dyes containing the carboxyl ion chromophoric system as described, for example, in *The Theory of the Photographic process*, Mees and James, Third Edition, 1967. Such useful dyes can be designated by the following structural formula which, for convenience, is used as representative of the various resonating structures of the dye:

wherein:

Q and Q' represent the nonmetallic atoms necessary to complete a 5- or 6-membered nucleus of the type used in oxonol dyes and typically contains at least one hetero atom selected from nitrogen, oxygen or sulfur. Exemplary cyclic nuclei of the type used in oxonol dyes as represented by Formulas II and III, which are merely different resonating forms of the same nuclei as is typical of the carboxyl ion chromophoric system, include an isoxazolinone nucleus (e.g., (3-phenyl-2-isoxazolin-5-one, 3-methyl-2-isoxazolin-5-one, etc), an oxindole nucleus (e.g., 1-alkyl-2,3-dihydro-2-oxindoles, etc), a 2,4,6-triketohexahydropyrimidine nucleus (e.g., barbituric acid or 2-thiobarbituric acid, as well as their 1-alkyl (e.g., 1-methyl, 1-ethyl, 1-n-propyl, 1-n-heptyl, etc), or 1,3-dialkyl (e.g., 1,3-dimethyl, 1,3-diethyl, 1,3-di-n-propyl, 1,3-diisopropyl, 1,3-dicyclohexyl, 1,3-di(2-methoxyethyl), 1,3-di(dialkylaminoalkyl), 1-alkyl-3-(2-morpholinoalkyl), etc), or 1,3-diaryl (e.g., 1,3-diphenyl, 1,3-di(4-chlorophenyl), 1,3-di(4-ethoxycarbonylphenyl), 1,3-di(dialkylaminophenyl), etc, or 1-aryl (e.g., 1-phenyl, 1-p-chlorophenyl, 1-p-ethoxycarbonylphenyl, etc), or 1-alkyl-3-aryl (e.g., 1-ethyl-3-phenyl, 1- n-heptyl-3-phenyl, etc) derivatives, a 2(3H)-imidazo[1,2-a]pyridone nucleus; a 5,7-dioxo-6,7-dihydro-5-thiazolo[3,2-a]pyrimidine nucleus (e.g., 5,7-dioxo-3-phenyl-6,7-dihydro-5-thiazolo[3,2-a]pyrimidine nucleus), a thianaphthenone nucleus (e.g., 3(2H)-thianaphthenone, 3(2H)-thianaphthenone-1,1-dioxide, etc), a 2H-pyran-2-one (e.g., 3-acetyl-5-ethoxycarbonyl-2H-pyran-2-one, etc), a 4-thiazolinone nucleus (e.g., 2-ethylmercapto-5-thiazolin-4-one, 2-alkylphenylamino-5-thiazolin-4-ones, 2-diphenylamino-5-thiazolinone-4-one, etc), a 2-imino-2-oxazolin-4-one (i.e., pseudohydantoin) nucleus, a 2,4-imidazolidinedione (i.e., hydantoin) nucleus (e.g., 2,4-imidazolidinedione, 3-ethyl-2,4-imidazolidinedione, 3-phenyl-2,4-imidazolidinedione, 3-α-naphthyl-2,4-imidazolidinedione, 1,3-diethyl-2,4-imidazolidinedione, 1-ethyl-3-α-naphthyl-2,4- imidazolidinedione, 1,3-diphenyl-2,4-imidazolidinedione, etc), a 1,3-indanedione nucleus, a dione or tetrone nucleus (e.g., 1,3-dioxane-4,6-dione, 2H-pyran-2,4,5,7-(1H, 3H, 6H)tetrone, etc), a 2-imidazolin-5-one nucleus (e.g., (2-n-propylmercapto-2-imidazolin-5-one, etc), etc. Especially useful, from the standpoint of efficiency, are compounds wherein Q represents the non-metallic atoms necessary to complete a 2,4,6-triketohexahydropyrimidine nucleus or a tetrone nucleus and/or $n$ is the integer 2. Of course, it is to be understood that the formulas II and III above can be reversed in that the chromophore of the dye is a resonating system.

Other related dyes which can be used in dye lasers are those of formula I wherein each of J, J', K and K' represent a cyano radical or any three of J, J', K and K' represent a cyano radical and the fourth substituent is as described previously.

The dyes described herein can be prepared, for example, by the techniques described in Taber et al U.S. Pat. No. 3,352,680, dated Nov. 14, 1967.

As used herein, the term "lasing concentration" refers to a concentration sufficient to promote, under appropriate conditions such as those mentioned herein, stimulated emission of the laser dye solution. Generally, concentrations of from about $10^{-1}$ to $10^{-6}$ molar are employed, with solutions of from $10^{-2}$ to $10^{-5}$ molar concentrations being preferred for maximum output energies. Still wider variations in concentration can be used for particular operations, if desired.

Representative useful non-interfering solvents which do not inhibit stimulated emission are water; alkanols, including mono-, di- and polyhydric alcohols containing from 1 to about 6 carbon atoms and preferably from 2 to about 4 carbon atoms, e.g., methanol, ethanol, isopropanol, isopropanediol, butanol, etc; and aryl alcohols such as various benzene derivatives wherein the hydroxy radical is attached directly to the aryl nucleus or is attached thereto through an alkylene moiety having from 1 to about 4 carbon atoms, e.g., phenol, methylphenol, resorcinol, phenylcarbinol, methylphenylcarbinol, etc. Other solvents include fluorinated organic alcohols corresponding to the alcohols described above and discussed further in copending Drexhage application Ser. No. 149,055, filed June 1, 1971, now Pat. No. 3,736,524, and entitled LASER MEDIA CONTAINING FLUORINATED ALCOHOLS, also heterocyclic compounds having a nitrogen heteroatom (e.g., pyridine, 2,6-dimethylpyridine, etc), and lower alkyl ketones such as dimethylketone. Of course, combinations of liquids can be used as can other solvents known to be useful in the dye laser art.

The present lasing media can be used in a variety of laser apparatus. A laser structure particularly adapted for testing organic dye liquid laser media is that described by Sorokin et al, *IBM Journal*, (supra). For continuous operation, the present lasing media can be used in apparatus of the type described in copending application of S. A. Tuccio and O. G. Peterson, Ser. No. 117,595, filed Feb. 22, 1971, now abandoned, and entitled CW ORGANIC DYE LASER.

The following embodiments are included for a further understanding of the invention. Unless otherwise stated, the excitation source in the following examples is a giant pulse from a 530.0 nm. frequency doubled, neodymium glass laser. The dye lasing medium is placed in a cuvette which is located between two dielectric mirrors which form a nearly hemispherical dye laser cavity. The light from the excitation or pumping source passes through one of the dielectric mirrors into the dye-containing cuvette and along the optical axis of the cavity. A beam splitter is used to sample the output from the excitation source in order to determine the wavelength of lasing. Embodiments 1 through 13 utilize a dye having the structure:

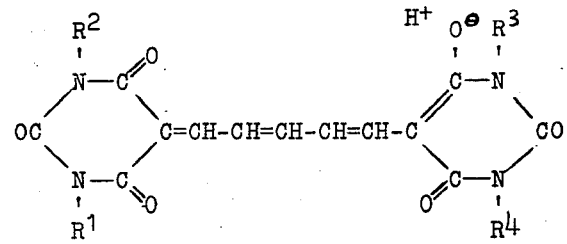

EMBODIMENT 1

Bis(1-heptyl-3-phenyl-5-barbituric acid) pentamethaneoxonol, ($R^1$ and $R^4$ are phenyl and $R^2$ and $R^3$ are heptyl) is mixed in methanol to an optical density of about 2.0 in a 5 cm dye cuvette. The cuvette is placed between two dielectric mirrors as described above. The dye lases at a wavelength of about 643 nm.

EMBODIMENT 2

Embodiment 1 is repeated except that the dye is bis-[1,3-di(o-methoxyphenyl)-5-barbituric acid]pentamethine-oxonol ($R^1$, $R^2$, $R^3$ and $R^4$ are all methoxyphenyl). The dye lases at about 648 nm.

EMBODIMENT 3

Embodiment 1 is repeated except that the dye is bis[-1,3-di($\beta$-methoxyethyl)-5-barbituric acid]pentamethine oxonol. The dye lases at about 635 nm.

EMBODIMENT 4

Embodiment 1 is repeated except that the dye is bis(-1-ethyl-3-phenyl-5-barbituric acid)pentamethine oxonol. The dye lases at about 646 nm.

EMBODIMENT 5

Embodiment 1 is repeated except that the dye is bis-(1-ethyl-5-barbituric acid)pentamethine oxonol. The dye lases at about 648 nm.

EMBODIMENT 6

Embodiment 1 is repeated except that the dye is bis-(1,3-diphenyl-5-barbituric acid)pentamethine oxonol. The dye lases at about 644 nm.

EMBODIMENT 7

Embodiment 1 is repeated except that the dye is bis-[1,3-di(2-hydroxyethyl)-5-barbituric acid]pentamethine oxonol. The dye lases at about 634 nm.

EMBODIMENT 8

Embodiment 1 is repeated except that the dye is bis-[1,3-di(p-methoxyphenyl)-5-barbituric acid]pentamethine oxonol. The dye lases at about 650 nm.

EMBODIMENT 9

Embodiment 1 is repeated except that the dye is bis-[1-($\beta$-methoxyethyl)-5-barbituric acid]pentamethine oxonol. The dye lases at about 620 nm.

EMBODIMENT 10

Embodiment 1 is repeated except that the dye is (1,3-di-$\beta$-methoxyethyl-5-barbituric acid)(1,3-diphenyl-5-barbituric acid)pentamethine oxonol. The dye lases at about 640 nm.

EMBODIMENT 11

Embodiment 1 is repeated except that the dye is bis-(1-n-heptyl-5-barbituric acid)pentamethine oxonol. The dye lases at about 646 nm.

EMBODIMENT 12

Embodiment 1 is repeated except that the dye is bis-[1,3-bis(2-diethylaminoethyl)-5-barbituric acid]pentamethine oxonol. The dye lases at about 643 nm.

EMBODIMENT 13

Embodiment 1 is repeated except that the dye is bis-[1-ethyl-3-(2-morpholinoethyl)-5-barbituric acid]pentamethine oxonol. The dye lases at about 648 nm.

EMBODIMENT 14

Embodiment 1 is repeated except that the dye is bis-[2-hexyl-2-methyl-5-(1,3-dioxane-4,6-dione)]pentamethine oxonol, potassium salt. The dye lases at about 614 nm.

EMBODIMENT 15

Embodiment 1 is repeated except that the dye is [1,3-di(4-ethoxyphenyl)-5-barbituric acid][3-phenyl-4-(2-isoxazolin-5-one)]pentamethine oxonol. The dye lases at about 622 nm.

EMBODIMENT 16

Embodiment 1 is repeated except that the dye is bis-[1,3-diethyl-6-(2H-pyrano[2,3-d]pyrimidine-2,4,5,7,(1H, 3H, 6H)-tetrone)]pentamethine oxonol. The dye lases at about 674 nm.

EMBODIMENT 17

Embodiment 1 is repeated except that the dye is bis-[6-methyl-3-(2H)-pyran-2,4(3H)-dione)]pentamethine oxonol. The dye lases at about 668 nm.

EMBODIMENT 18

Embodiment 1 is repeated except that the dye is bis-(1-ethyl-2-thio-5-barbituric acid)pentamethine oxonol, triethylamine salt. The dye lases at about 674 nm.

EMBODIMENT 19

Embodiment 1 is repeated except that the dye is bis-(1,3-diethyl-2-thio-5-barbituric acid)trimethine oxonol and the solvent is pyridine. The dye lases at about 567 nm.

The invention has been described in detail with particular reference to certain preferred embodiments thereof, but it will be understood that variations and modifications can be effected within the spirit and scope of the invention.

We claim:

1. A dye laser comprising a laser dye solution, a pumping energy source operably coupled therewith for producing a population inversion in said solution and a means optically coupled to the population inverted solution to stimulate therein coherent laser emission, said dye solution comprising a lasing concentration in a non-interfering solvent of a dye having a formula as follows:

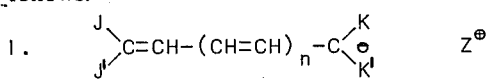

wherein:

$n$ represents a positive integer having a value of 1 to 3;

$Z^+$ represents a hydrogen or a cation;

J, J', K and K', when taken alone, each represents a member selected from the group consisting of a cyano radical, an alkoxycarbonyl radical, an acyl radical, and an alkyl substituted, aryl substituted or aryloxy substituted sulfonyl radical, with the proviso that only one of J and J' and one of K and K' can be a cyano radical, and, J and J', when taken together and with the carbon atoms to which they are attached, and K and K', when taken together and with the carbon atom to which they are attached, represent, respectively, the radicals:

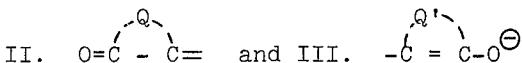

wherein:

Q and Q' represent the nometallic atoms necessary to complete a nucleus selected from the group consisting of an isoxazolinone nucleus, an oxindole nucleus, a 2,4,6-triketohexahydropyrimidine nucleus, a 2(3H)-imidazopyridone nucleus, a 5,7-dioxo-6,7-dihydro-5-thiazolopyrimidine nucleus, a thianaphthenone nucleus, a 2H-pyran-2-one nucleus, a 4-thiazolinone nucleus, a 2-imino-2-oxazolin-4-one, a cyclic dione nucleus or a cyclic tetrone nucleus.

2. The invention as described in claim 1 wherein said dye is present in a concentration of about $10^{-2}$ to $10^{-5}$ molar.

3. A dye laser comprising a laser dye solution, a pumping energy source operably coupled therewith for producing a population inversion in said solution and a means optically coupled to the population inverted solution to stimulate therein coherent laser emission, said dye solution comprising a lasing concentration, in a non-interfering solvent of a dye having a formula as follows:

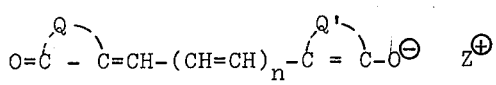

wherein:

$n$ represents a positive integer having a value of 1 to 3;

$Z^+$ represents a hydrogen or a cation;

Q and Q' each represent the nonmetallic atoms necessary to complete a nucleus selected from the group consisting of an isoxazolinone nucleus, an oxindole nucleus, a 2,4,6-triketohexahydropyrimidine nucleus, a 2(3H)-imidazopyridone nucleus, a 5,7-dioxo-6,7-dihydro-5-thiazolopyrimidine nucleus, a thianaphthenone nucleus, a 2H-pyran-2-one nucleus, a 4-thiazolinone nucleus, a 2-imino-2-oxazolin-4-one, a 2,4-imidazolidinedione nucleus, a 1,3-inanedione nucleus, a dioxanedione nucleus, a pyrantetrone nucleus,, a 2-imidazolin-5-one nucleus.

4. The invention as described in claim 3 wherein Q and Q' each represent the atoms necessary to complete a 2,4,6-triketohexahydropyrimidine nucleus.

5. A method of producing coherent laser emission, between about 500 nm and about 800 nm, in the operation of a dye laser comprising a laser dye solution, a pumping energy source operably coupled therewith for producing a population inversion in said solution and a means optically coupled to the population inverted solution to stimulate therein coherent laser emission, said method comprising the steps of pumping a dye solution to produce a population inversion in said solution and stimulating in the population inverted solution coherent laser emission, wherein said dye solution comprises a lasing concentration in a non-interfering solvent, of a dye having the formula I. 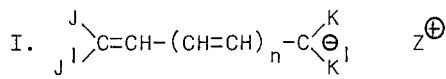

wherein:

$n$ represents a positive integer having a value of 1 to 3;

$Z^+$ represents a hydrogen or a cation;

J, J', K and K', when taken alone, each represents a member selected from the group consisting of a cyano radical, an alkoxycarbonyl radical having from 1 to about 4 carbon atoms in the alkyl moiety, an acyl radical having 1 o to about 4 carbon atoms in the alkyl portion, and a substituted sulfonyl radical having substituents selected from an alkyl radical, an aryl radical and an aryloxy radical, with the proviso that only one of J and J' and one of K and K' can by a cyano radical, and J and J', when taken together and with the carbon atoms to which they are attached, and K and K', when taken together and with the carbon atom to which they are attached represent, respectively, the radicals:

II. 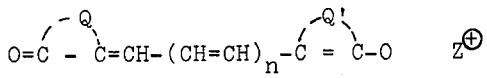 and III.

wherein:

Q and Q' represent the nonmetallic atoms necessary to complete a nucleus selected from the group consisting of an isoxazolinone nucleus, an oxindole nucleus, a 2,4,6-triketohexahydropyrimidine nucleus, a 2(3H)-imidazopyridone nucleus, a 5,7-dioxo-6,7-dihydro-5-thiazolopyrimidine nucleus, a thianaphthenone nucleus, a 2H-pyran-2-one nucleus, a 4-thiazolinone nucleus, a 2-imino-2-oxazolin-4-one, a cyclic dione nucleus or a cyclic tetrone nucleus.

6. The method as described in claim 5 wherein $n$ equals 2.

7. A method of producing coherent laser emission, between about 500 nm and about 800 nm, in the operation of a dye laser comprising a laser dye solution, a pumping energy source operably coupled therewith for producing a population inversion in said solution and a means optically coupled to the population inverted solution to stimulate therein coherent laser emission, said method comprising the steps of pumping a dye solution to produce a population inversion in said solution and stimulating in the population inverted solution coherent laser emission, wherein said dye solution comprises a lasing concentration in a non-interfering solvent, of a dye having the formula

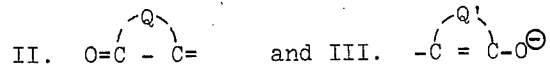

wherein:

$n$ represents a positive integer having a value of 1 to 3;

$Z^+$ represents a hydrogen or a cation;

Q and Q' each represent the nonmetallic atoms necessary to complete a nucleus selected from the group consisting of an isoxazolinone nucleus, an oxindole nucleus, a 2,4,6-triketohexahydropyrimidine nucleus, a 2(3H)-imidazo-pyridone nucleus, a 5,7-dioxo-6,7-dihydro-5-thiazolo-pyrimidine nucleus, a thianaphthenone nucleus, a 2H-pyran-2-one nucleus, a 4-thiazolinone nucleus, a 2-imino-2oxazolin-4-one, a 2,4-imidazolidinedione nucleus, a 1,3-inanedione nucleus, a dioxanedione nucleus, a pyrantetrone nucleus, a 2-imidazolin-5-one nucleus.

8. The method as described in claim 7 wherein Q and Q' each represent the atoms necessary to complete a 2,4,6-triketohexahydropyrimidine nucleus.

* * * * *

UNITED STATES PATENT AND TRADEMARK OFFICE
CERTIFICATE OF CORRECTION

PATENT NO. : 3,879,678

DATED : April 22, 1975

INVENTOR(S) : William C. McColgin and Frank G. Webster

It is certified that error appears in the above-identified patent and that said Letters Patent are hereby corrected as shown below:

Column 8, line 30, "imidazopyridone", should read --imidazo-[1,2-a]pyridone--.

Column 8, line 31, "thiazolopyrimidine", should read --thiazolo[3,2-a]pyrimidine--.

Column 8, line 61, "imidazopyridone", should read --imidazo-[1,2-a]pyridone--.

Column 8, line 62, "thiazolopyrimidine", should read --thiazolo[3,2-a]pyrimidine--.

Column 9, line 30, "having 1 o to about 4", should read --having 1 to about 4--.

Column 9, line 35, "K' can by a cyano", should read --K' can be a cyano--.

Column 10, line 3, "imidazopyridone", should read --imidazo-[1,2-a]pyridone--.

Column 10, line 4, "thiazolopyrimidine", should read --thiazolo[3,2-a]pyrimidine--.

Column 10, line 7, "nuclues", should read --nucleus--.

Column 10, line 37, "imidazopyridone", should read --imidazo-[1,2-a]pyridone--

Column 10, line 38, "thiazolopyrimidine", should read --thiazolo[3,2-a]pyrimidine--.

UNITED STATES PATENT AND TRADEMARK OFFICE
CERTIFICATE OF CORRECTION

PATENT NO. : 3,879,678

DATED : April 22, 1975

INVENTOR(S) : William C. McColgin and Frank G. Webster

It is certified that error appears in the above-identified patent and that said Letters Patent are hereby corrected as shown below:

Column 10, line 40, "2-imino-2oxazolin-4", should read --2-imino-2-oxazolin-4- --.

Signed and Sealed this eighth Day of June 1976

[SEAL]

Attest:

RUTH C. MASON
*Attesting Officer*

C. MARSHALL DANN
*Commissioner of Patents and Trademarks*